US012597747B2

(12) United States Patent
Toriumi et al.

(10) Patent No.: US 12,597,747 B2
(45) Date of Patent: Apr. 7, 2026

(54) ELECTRICAL CONNECTOR AND ELECTRICAL CONNECTOR ASSEMBLY

(71) Applicant: Hirose Electric Co., Ltd., Yokohama (JP)

(72) Inventors: Nozomu Toriumi, Yokohama (JP); Naoki Ninomiya, Yokohama (JP)

(73) Assignee: HIROSE ELECTRIC CO., LTD., Yokohama (JP)

( * ) Notice: Subject to any disclaimer, the term of this patent is extended or adjusted under 35 U.S.C. 154(b) by 266 days.

(21) Appl. No.: 18/486,929

(22) Filed: Oct. 13, 2023

(65) Prior Publication Data

US 2024/0146008 A1 May 2, 2024

(30) Foreign Application Priority Data

Oct. 28, 2022 (JP) ................................ 2022-173015

(51) Int. Cl.
*H01R 24/54* (2011.01)
*H01R 103/00* (2006.01)

(52) U.S. Cl.
CPC ....... *H01R 24/545* (2013.01); *H01R 2103/00* (2013.01)

(58) Field of Classification Search
CPC ... H01R 24/545; H01R 2103/00; H01R 4/027
USPC .................................................. 439/582, 578
See application file for complete search history.

(56) References Cited

U.S. PATENT DOCUMENTS

| | | | | |
|---|---|---|---|---|
| 5,284,449 | A * | 2/1994 | Vaccaro | H01B 3/441 439/583 |
| 6,089,903 | A * | 7/2000 | Stafford Gray | H01R 4/4823 439/588 |
| 10,218,131 | B2 * | 2/2019 | Harwath | H01R 4/5033 |
| 10,573,988 | B2 * | 2/2020 | Mellott | H01R 13/62 |

FOREIGN PATENT DOCUMENTS

JP 2015-220187 A 12/2015

* cited by examiner

*Primary Examiner* — Briggitte R. Hammond
(74) *Attorney, Agent, or Firm* — Procopio, Cory, Hargreaves & Savitch LLP

(57) ABSTRACT

Herein is an electrical connector with an inner conductor extending in the mating direction, a main body portion extending in the mating direction to accommodate one end of the inner conductor and to which a coaxial cable is attached, and a mating portion extending in the mating direction to accommodate the other end of the inner conductor and mates with a counterpart connector. An accommodating space in the main body portion accommodates one end of the inner conductor. An attachment aperture communicates with the accommodating space by extending in the lateral direction perpendicular to the mating direction and attaches the coaxial cable to the main body portion to connect its center conductor to one end of the inner conductor. The attachment aperture of the main body portion includes a tapered portion decreasing in diameter toward the accommodating space at the end proximal to the accommodating space.

4 Claims, 5 Drawing Sheets

ELECTRICAL CONNECTOR AND ELECTRICAL CONNECTOR ASSEMBLY

BACKGROUND

Cross-Reference to Related Applications

This application claims priority to Japanese Patent Application No. 2022-173015, filed Oct. 28, 2022, the contents of which are incorporated herein by reference in its entirety for all purposes.

Technical Field

The present invention relates to an electrical connector that has a coaxial cable attached thereto and that mates with a counterpart connector, as well as to an electrical connector assembly including such an electrical connector.

Background Art

Heretofore, there have been known electrical connectors that have a coaxial cable attached thereto that mate with a counterpart connector, thereby electrically connecting the coaxial cable and the counterpart connector. Electrical connectors of this type include those in which the coaxial cable is attached in a lateral direction perpendicular to the direction of mating with the counterpart connector.

For example, Patent Document 1 describes an electrical connector of a generally L-shaped cross-section having an accommodating space extending in the direction of mating in a manner to accommodate an inner conductor having one end connected to a coaxial cable and the other end connected to a counterpart connector, and an attachment aperture designed to communicate with this accommodating space in the lateral direction and attach the coaxial cable in a manner to connect said coaxial cable to one end of the inner conductor.

PATENT DOCUMENTS

Patent Document 1

Japanese Published Patent Application No. 2015-220187.

SUMMARY

Problems to be Solved

Here, when a coaxial cable is attached to an electrical connector such as the one described in the above-mentioned Patent Document 1, the coaxial cable needs to be disposed in a manner for the center conductor of the coaxial cable to be accurately connected to the end of the inner conductor of the electrical connector. Specifically, the center conductor of the coaxial cable needs to be positioned at a connection portion or the like that is formed at the end of the inner conductor of the electrical connector and intended for contacting the center conductor of the coaxial cable.

However, it is not easy to accurately position the center conductor of the coaxial cable at the end (connection portion, etc.) of the inner conductor of the electrical connector during attachment of the coaxial cable. The reason is the extremely meticulous work required because of the thinness of the center conductor and, in addition, the small size of the end of the inner conductor. If the center conductor of the coaxial cable is not accurately positioned at the end of the inner conductor of the electrical connector, there is a chance that buckling will occur as a result of collision of the center conductor with locations other than the end of the inner conductor and, in the worst-case scenario, a short circuit will occur as a result of contact of the center conductor with another conductor.

The present invention was devised to eliminate the issues described above and, in an electrical connector or electrical connector assembly that has a coaxial cable attached thereto and that mates with a counterpart connector, it is an object of the invention to guide the coaxial cable in a manner for the coaxial cable to be accurately positioned at the end of the inner conductor of the electrical connector.

Technical Solution

An electrical connector according to one embodiment of the present invention, which is an electrical connector that has a coaxial cable attached thereto and that mates with a counterpart connector, thereby electrically connecting the coaxial cable and the counterpart connector, said electrical connector having an inner conductor which extends in the direction of mating with the counterpart connector, has one end connected to the center conductor of the coaxial cable and has the other end connected to a conductor of the counterpart connector, a main body portion which has a tubular shape extending in the direction of mating in a manner to accommodate one end of the inner conductor and to which the coaxial cable is attached, and a mating portion which is provided closer to the side where mating with the counterpart connector takes place than the main body portion, has a tubular shape extending in the direction of mating in a manner to accommodate the other end of the inner conductor and mates with the counterpart connector, wherein, in the main body portion, there are formed an accommodating space constituting a hollow section of a tubular shape extending in the direction of mating in a manner to accommodate one end of the inner conductor, and an attachment aperture designed to communicate with the accommodating space by extending in the lateral direction perpendicular to the direction of mating and to attach the coaxial cable to the main body portion in a manner to connect the center conductor of the coaxial cable to one end of the inner conductor, and the attachment aperture of the main body portion includes a tapered portion decreasing in diameter toward the accommodating space at the end proximal to the accommodating space.

Technical Effect

By use of the present invention in an electrical connector or electrical connector assembly that has a coaxial cable attached thereto and that mates with a counterpart connector, it will be possible to guide the coaxial cable in a manner for the coaxial cable to be accurately positioned at the end of the inner conductor of the electrical connector.

DETAILED DESCRIPTION

Figure 1:
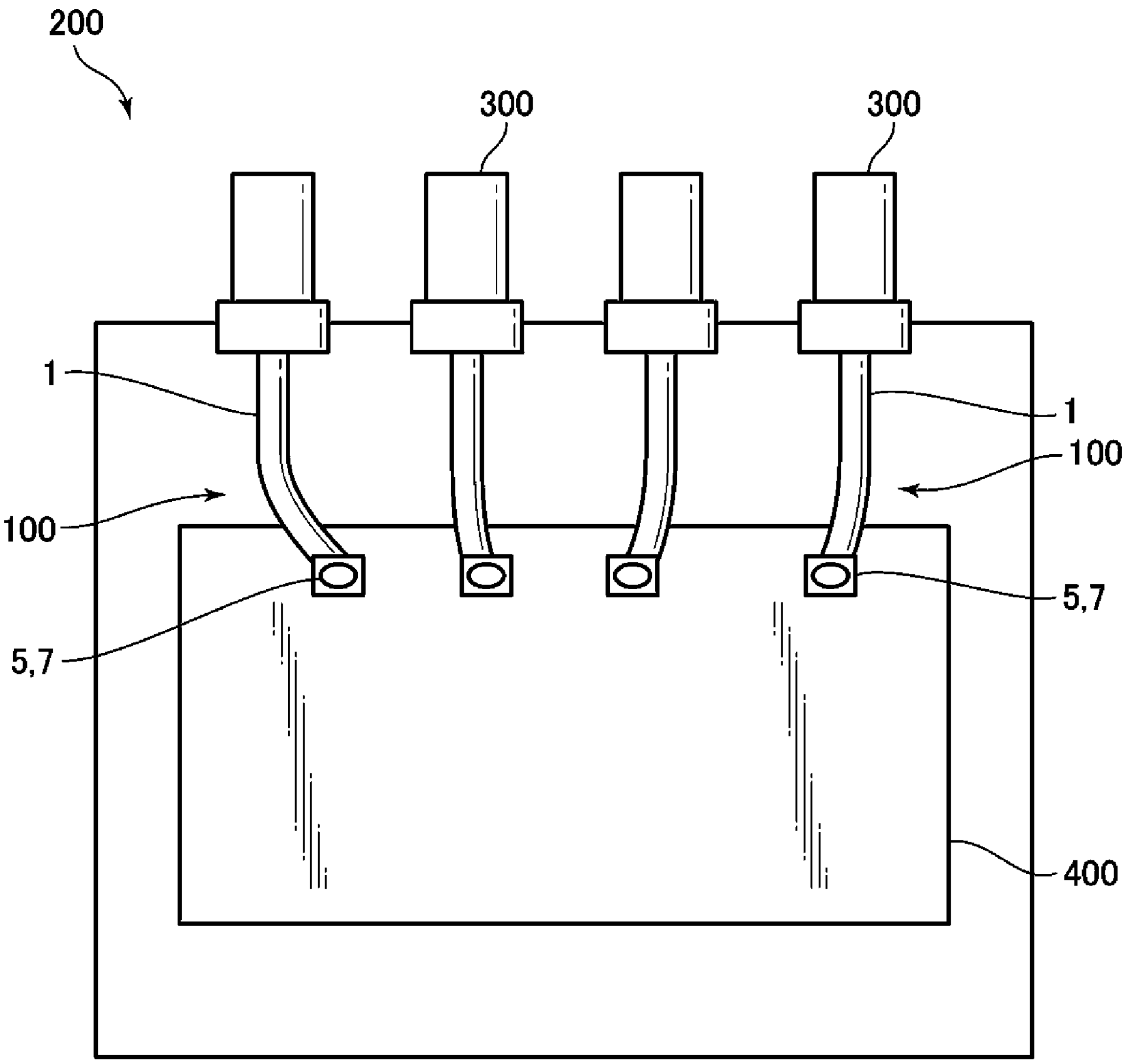
FIG. 1 illustrates a schematic component diagram of an antenna device in which electrical connector assemblies according to an embodiment of the present invention are employed.

Embodiments of the present invention will be described below with reference to drawings. It should be noted that, in principle, the same reference numerals have been assigned to the same parts in all the drawings used to illustrate the embodiments, and any further descriptions thereof have been omitted. In addition, despite the fact that each embodiment is described independently, this does not preclude configuring the electrical connector by combining the respective components.

[Configuration of the Electrical Connector Assembly]

First, the configuration of the electrical connector assembly according to the present embodiment will be described with reference to FIGS. 1 and 2. FIG. 1 is a schematic component diagram of an antenna device in which electrical connector assemblies according to the present embodiment are employed, and FIG. 2 is a plan view illustrating a state prior to assembly of the electrical connector assembly according to the present embodiment.

As shown in FIG. 1, the electrical connector assembly 100 according to the present embodiment is employed, for instance, in an antenna device 200 forming part of 5G base station equipment and the like. This electrical connector assembly 100 has a coaxial cable 1 and electrical connectors 5, 7 connected to this coaxial cable 1. Specifically, as shown in FIG. 2, in the electrical connector assembly 100, the coaxial cable 1 is connected to the electrical connector 5, and the coaxial cable 1, electrical connector 5, and counterpart connector 7 are adapted to be electrically connected by mating this electrical connector 5 with the electrical connector 7 (referred to as "counterpart connector 7" as appropriate). Such electrical connector assemblies 100, a plurality of which are used in the antenna device 200 as shown in FIG. 1, are adapted to electrically connect a plurality of antenna elements 300 and a substrate 400, which is an RF substrate, to effect transmission of radio-frequency signals.

Figure 2:
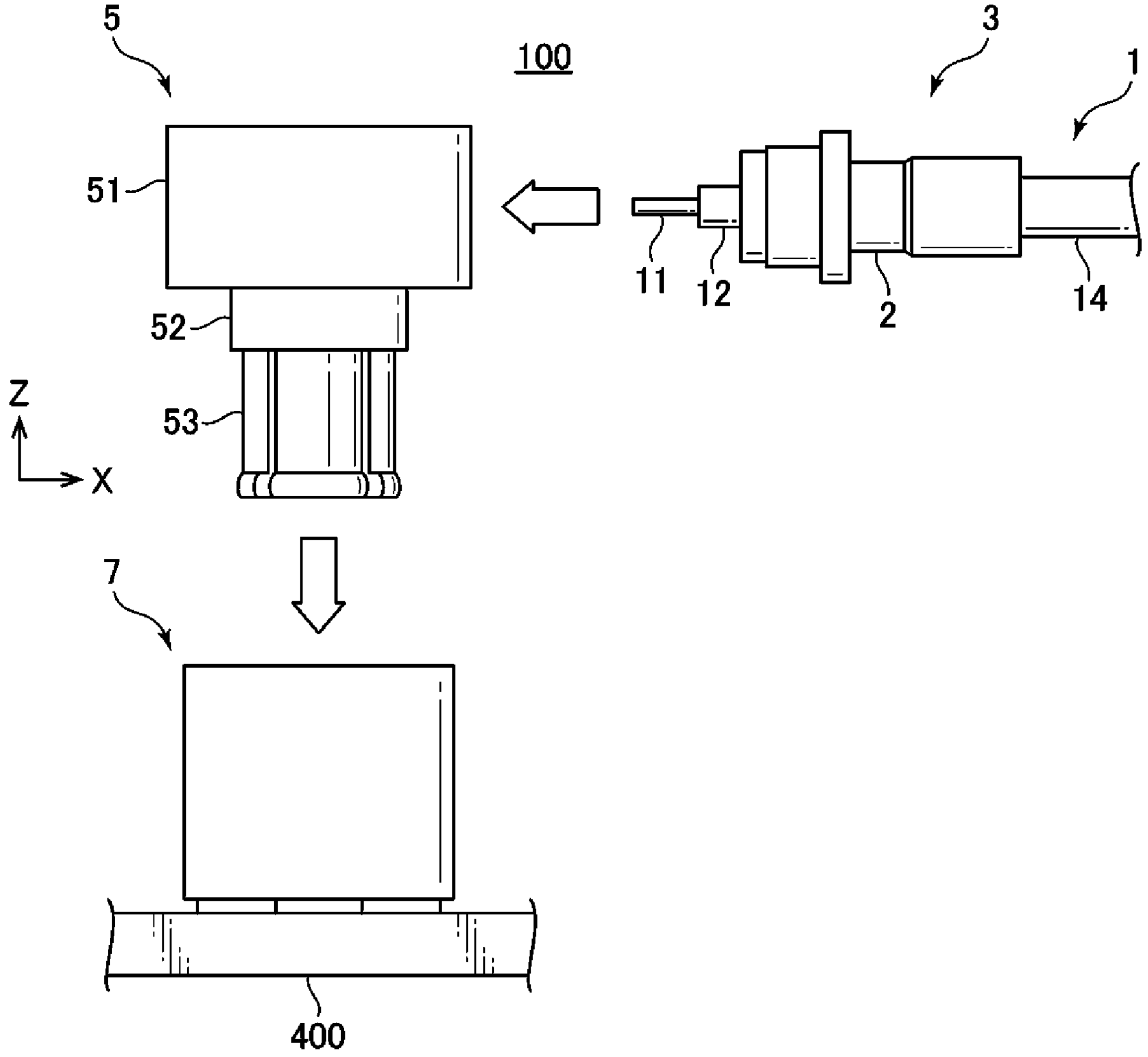
FIG. 2 illustrates a plan view illustrating a state prior to assembly of the electrical connector assembly according to an embodiment of the present invention.

More specifically, as shown in FIG. 2, the electrical connector assembly 100 according to the present embodiment is adapted such that the above-mentioned coaxial cable 1 is retained by a cable-retaining member 2. In particular, the electrical connector assembly 100 uses a cable assembly 3 including a coaxial cable 1, which has a center conductor 11, an insulator 12, a jacket 14, etc., and a cable-retaining member 2 (also referred to as a cord tube) of a generally cylindrical shape attached to the outside of the coaxial cable 1 and retaining said coaxial cable 1.

Further, the electrical connector 5 of the electrical connector assembly 100 has a main body portion 51, which has a tubular shape extending in the direction of mating Z in a manner to accommodate one end of the inner conductor (not shown) and to which the cable assembly 3 is attached. Additionally, the electrical connector 5 has a mating portion 53, which is coupled to this main body portion 51 through the medium of a coupling portion 52, has a tubular shape extending in the direction of mating Z in a manner to accommodate the other end of the inner conductor, and mates with the counterpart connector 7. The cable assembly 3 is adapted to be attached to the main body portion 51 of the electrical connector 5 in the lateral direction X perpendicular to the direction of mating Z. It should be noted that after the cable assembly 3 is attached to the main body portion 51 of the electrical connector 5, a heat-shrink tube (not shown) is attached to the outside thereof (in particular, to the outside of the section corresponding to the cable-retaining member 2).

On the other hand, the counterpart connector 7 is connected to the electrical connector 5 by receiving the mating portion 53 of the electrical connector 5 and mating with said mating portion 53. Specifically, the counterpart connector 7 also has an inner conductor (not shown), and when said mating takes place, the inner conductor of the electrical connector 5 and the inner conductor of the counterpart connector 7 are connected. In addition, the counterpart connector 7 is mounted on the substrate 400. For this reason, when the electrical connector 5 and the counterpart connector 7 are mated, the electrical connector 5 and the substrate 400 are connected through the medium of the counterpart connector 7.

[Configuration of the Cable Assembly]

Figure 3:
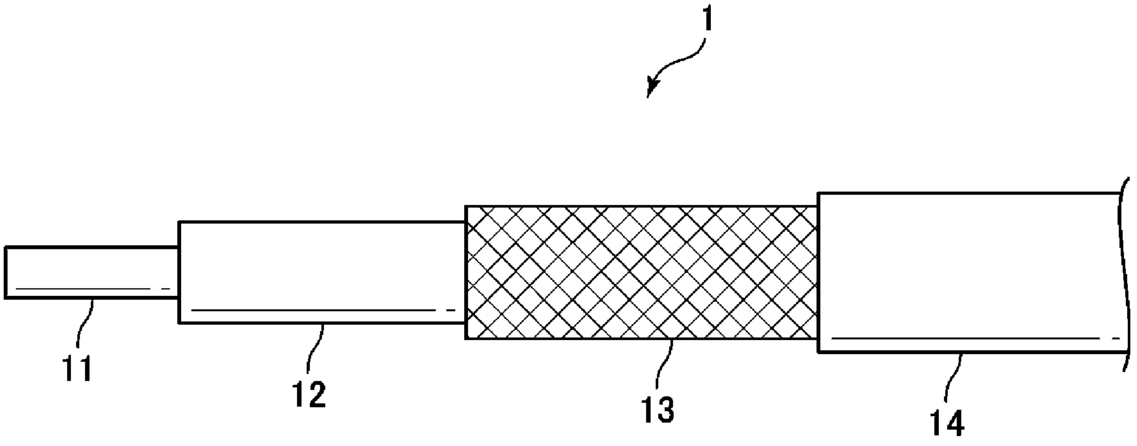
FIG. 3 illustrates a plan view of a coaxial cable prior to attachment of a cable-retaining member according to an embodiment of the present invention.

The configuration of the cable assembly 3 according to the present embodiment will be described next with reference to FIGS. 3 and 4. FIG. 3 is a plan view of the coaxial cable 1 prior to attachment of the cable-retaining member 2, and FIG. 4 is a cross-sectional view of the cable assembly 3 in which the cable-retaining member 2 is attached to the coaxial cable 1, taken along the axial direction.

As shown in FIG. 3, prior to attachment of the cable-retaining member 2, in the coaxial cable 1, the center conductor 11 is exposed at the distal end portion (i.e., the section on the side where insertion into the electrical connector 5 takes place; below, the insertion side is simply called "the front," and the side opposite said insertion side (the front) is simply called "the rear"), the insulator 12 is exposed at the rear of the section in which the center conductor 11 is exposed, and the outer conductor 13 is exposed at the rear of the section in which the insulator 12 is exposed. The part located further to the rear of the section in which the outer conductor 13 is exposed represents the original condition of the coaxial cable 1 equipped with the jacket 14. It should be noted that a dielectric may be used as the insulator 12 of the coaxial cable 1.

Figure 4:
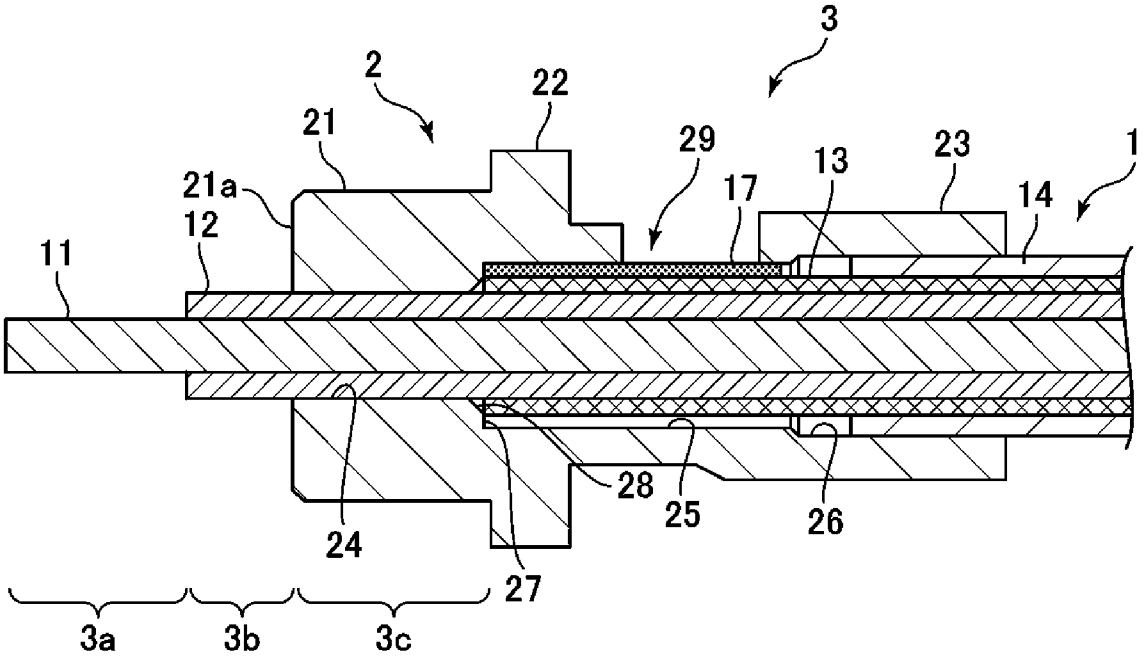
FIG. 4 illustrates a cross-sectional view of a cable assembly according to an embodiment of the present invention taken along the axial direction.

As shown next in FIG. 4, in the cable assembly 3, the metal cable-retaining member 2 is attached to the coaxial cable 1 in the state illustrated in FIG. 3. In brief, this cable-retaining member 2 is configured by coupling two tubular portions 21, 23 of different diameters (the tubular portion 21 has a larger diameter than the tubular portion 23) extending in the axial direction and having a generally cylindrical shape. These tubular portions 21, 23 include communicating through-holes 24, 25, and 26, and the coaxial cable 1 is accommodated within these through-holes 24, 25, 26. In addition, in the tubular portion 21, a radially outwardly protruding annular flange portion 22 is provided on the outer peripheral surface in the vicinity of the section that couples to the tubular portion 23

More particularly, the through-hole 24 has a diameter corresponding to the diameter of the insulator 12 of the coaxial cable 1 (a diameter slightly larger than the diameter of the insulator 12), the through-hole 25 has a diameter corresponding to the diameter of the outer conductor 13 of the coaxial cable 1 (a diameter slightly larger than the diameter of the outer conductor 13), and the through-hole 25 has a diameter corresponding to the diameter of the jacket 14 of the coaxial cable 1 (a diameter slightly larger than the diameter of the jacket 14). In this manner, when the cable-retaining member 2 is attached to the coaxial cable 1, the cable-retaining member 2 is adapted such that the section in which the insulator 12 of the coaxial cable 1 is exposed is accommodated in the section corresponding to the through-hole 24, the section in which the outer conductor 13 of the coaxial cable 1 is exposed is accommodated in the section corresponding to the through-hole 25, and the section in which the outer conductor 13 of the coaxial cable 1 is exposed as well as the section corresponding to the jacket 14 are accommodated in the section corresponding to the through-hole 26.

When this cable-retaining member 2 is attached to the coaxial cable 1, the coaxial cable 1 is inserted from the rear of the cable-retaining member 2 (i.e., via the through-hole 26) toward the front. As the coaxial cable 1 is inserted into the cable-retaining member 2 in this manner, the front end of the section in which the outer conductor 13 is exposed in the coaxial cable 1 collides with an annular surface 27 formed at the boundary between the through-hole 24 and the through-hole 25 (i.e., in the section in which the diameter of the through-hole changes over from a diameter corresponding to the diameter of the outer conductor 13 to a diameter corresponding to the diameter of the insulator 12), as a result of which the coaxial cable 1 cannot enter the cable-retaining member 2 any further. Therefore, the coaxial cable 1 is inserted into the cable-retaining member 2 until the section in which the outer conductor 13 is exposed collides with the annular surface 27. Here, a decreasing diameter portion 28 decreasing in diameter toward the front is formed at the radially inner edge of the annular surface 27, and when the coaxial cable 1 is inserted into the cable-retaining member 2, this decreasing diameter portion 28 prevents the insulator 12 from being damaged by colliding with the annular surface 27. The surface forming the decreasing diameter portion 28 is inclined, for example, at 45 degrees relative to the axial direction.

It should be noted that below, in the cable assembly 3 comprising the coaxial cable 1 to which the cable-retaining member 2 is attached, the section in which the center conductor 11 is exposed is called "the first section 3*a*," the section in which the insulator 12 is exposed, located further to the rear of this first section 3*a*, is called "the second section 3*b*," and the front section in which the cable-retaining member 2 is attached in a manner to cover at least the exposed insulator 12, which is located further to the rear of the second section 3*b*, is called "the third section 3*c*."

After the coaxial cable 1 is inserted into the cable-retaining member 2 in this manner, the section in which the outer conductor 13 is exposed in the coaxial cable 1 is soldered (see reference numeral 17) through a window portion 29 formed in a section of the tubular portion 23 of the cable-retaining member 2. As a result, the outer conductor 13 of the coaxial cable 1 and the tubular portion 23 of the cable-retaining member 2 are securely joined by the solder 17. An electrical connection between the outer conductor 13 of the coaxial cable 1 and the cable-retaining member 2 is then ensured. The above-described step completes the cable assembly 3, which is attachable to the electrical connector 5 (see FIG. 2).

[Configuration of the Electrical Connector]

Figure 5:
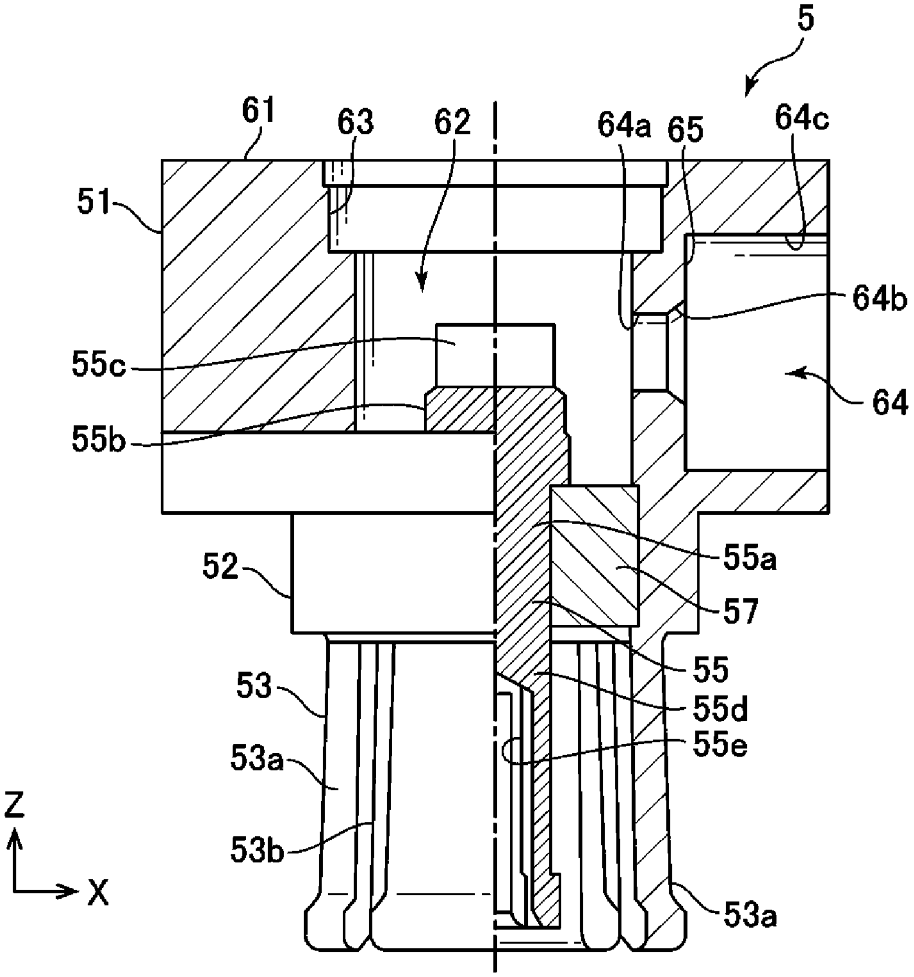
FIG. 5 illustrates a cross-sectional view of an electrical connector according to an embodiment of the present invention taken along the direction of mating.
Figure 6:
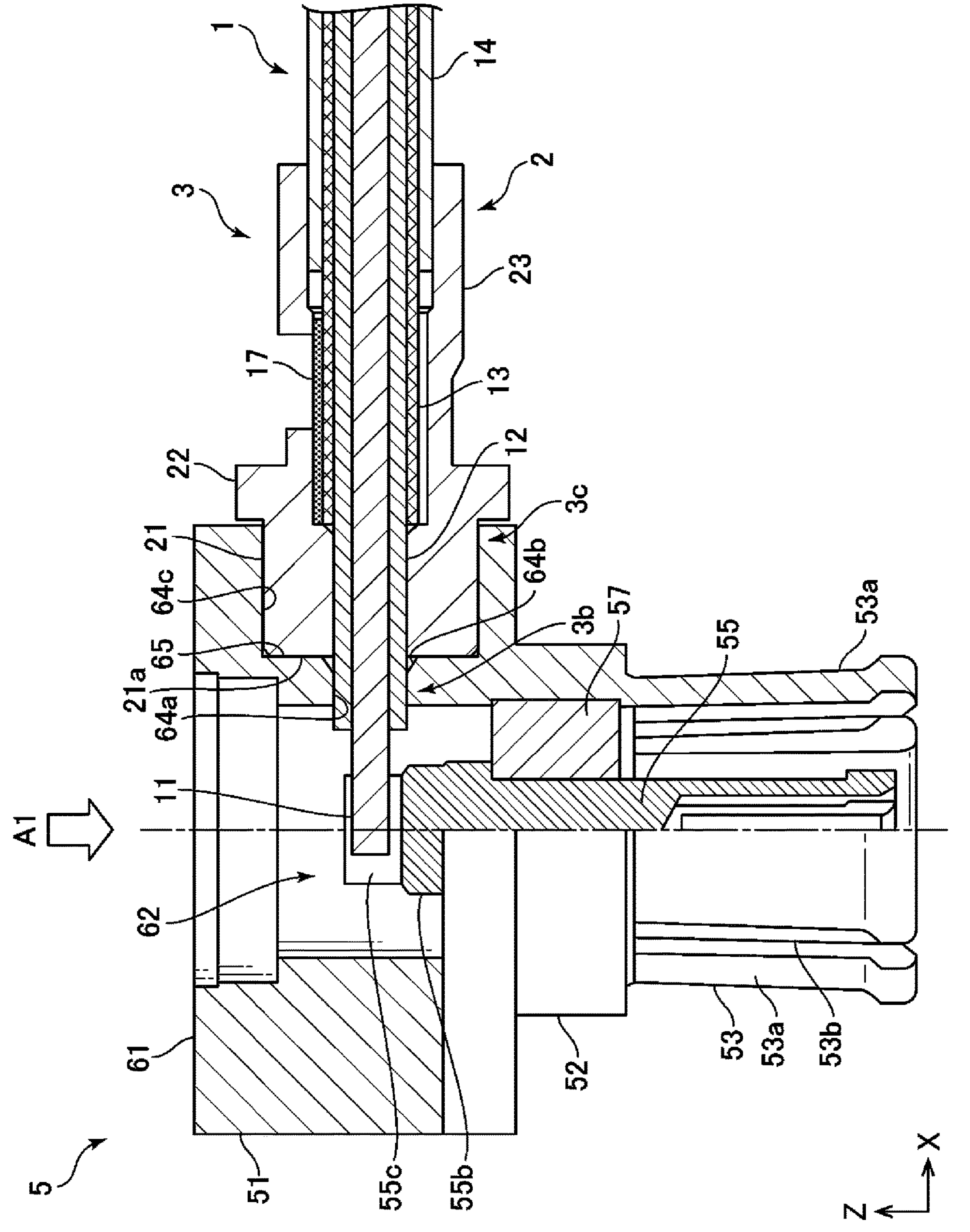
FIG. 6 illustrates a cross-sectional view of the electrical connector and the cable assembly according to an embodiment of the present invention taken along the direction of mating.
Figure 7:
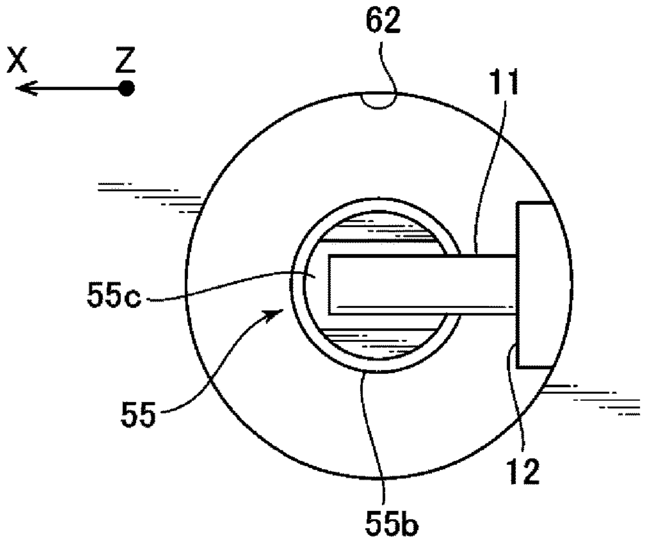
FIG. 7 illustrates a top view illustrating a section of the electrical connector, etc., according to an embodiment of the present invention as viewed in the direction of arrow A1 in FIG. 6.

The configuration of the electrical connector 5 according to the present embodiment will be described next with reference to FIGS. 5-7. FIG. 5 is a cross-sectional view of the electrical connector 5 according to the present embodiment taken along the direction of mating Z, FIG. 6 is a cross-sectional view, taken along the direction of mating Z, of the electrical connector 5 to which the above-described cable assembly 3 is attached, and FIG. 7 is a top view illustrating a section of the electrical connector 5, etc., as viewed in the direction of arrow A1 in FIG. 6.

As shown in FIG. 5, the electrical connector 5 mainly comprises a main body portion 51 to which the cable assembly 3 is attached, a mating portion 53 which is provided closer to the mating side than the main body portion 51 and mates with the counterpart connector 7 (not shown), a coupling portion 52 which couples the main body portion 51 and the mating portion 53, and an inner conductor 55 which is accommodated within the main body portion 51, coupling portion 52, and mating portion 53. Specifically, the main body portion 51, coupling portion 52, and mating portion 53, which are made of metal and molded as a single piece, have a tubular shape extending in the direction of mating Z and accommodate the inner conductor 55 in the center of the hollow section of this tubular shape. In addition, the inner conductor 55 extends in the direction of mating Z and is adapted to have one end connected to the center conductor 11 of the coaxial cable 1 and the other end connected to the inner conductor (not shown) of the counterpart connector 7. Further, the main body portion 51 accommodates one end of the inner conductor 55 connected to the coaxial cable 1, and the mating portion 53 accommodates the other end of the inner conductor 55 connected to the counterpart connector 7. Here, the inner conductor 55 is configured in a manner to transmit radio-frequency signals, whereas the main body portion 51, coupling portion 52, and mating portion 53 constitute an outer conductor serving as an electromagnetic shield protecting against external noise in the transmission of radio-frequency signals by the inner conductor 55.

More particularly, the mating portion 53 of the electrical connector 5 has a plurality of resilient pieces 53*a* spaced apart from each other in the circumferential direction by a plurality of slits 53*b*. When said mating portion 53 is mated with the counterpart connector 7, the resilient pieces 53*a* of the mating portion 53 are radially inwardly deflected, thereby applying a reaction force (resilient force) tending to restore them to the original condition to the counterpart connector 7. In this manner, the mating engagement of the mating portion 53 of the electrical connector 5 and the counterpart connector 7 is retained. In addition, the coupling portion 52 of the electrical connector 5 has a support fixture portion 57 radially inwardly securing the inner conductor 55. This support fixture portion 57 has a generally disk-like shape having an axial thickness and secures the inner conductor 55 in an electrically insulated state.

In addition, in the main body portion 51 of the electrical connector 5, an accommodating space 62, which extends in the direction of mating Z and has a generally circular cross-section, is formed within the peripheral wall 61 constituting said main body portion 51. An opening portion 63, used to attach a lid (not shown), is provided in the top portion of the accommodating space 62 (at the end opposite the mating side). Upon attachment of the cable assembly 3 to the main body portion 51, this opening portion 63 is adapted to be closed by a lid attached thereto. In addition, an attachment aperture 64, which communicates with the accommodating space 62 by extending through the peripheral wall 61 in the lateral direction X and has a generally circular cross-section, is formed in the lateral face of the peripheral wall 61. This attachment aperture 64 is used to attach the cable assembly 3 to the main body portion 51 in a manner to connect the center conductor 11 of the coaxial cable 1 to one end (the hereinafter-described connection portion 55*b*) of the inner conductor 55.

More particularly, as shown in FIGS. 5 and 6, the attachment aperture 64 has a first constant-diameter portion 64*a* extending in the lateral direction X at a diameter corresponding to the diameter of the insulator 12 (a diameter slightly larger than the diameter of the insulator 12) for the purpose of retaining the second section 3*b* in which the insulator 12 is exposed in the cable assembly 3. In addition, the attachment aperture 64 has a second constant-diameter portion 64*c* extending in the lateral direction X at a diameter corresponding to the diameter of the third section 3*c* (a diameter slightly larger than the diameter of the third section 3*c*) for the purpose of retaining the third section 3*c* (the front section of the cable-retaining member 2) to which the cable-retaining member 2 is attached in a manner to cover at least the insulator 12 exposed in the cable assembly 3. The diameter of the second constant-diameter portion 64*c* is larger than the diameter of the first constant-diameter portion 64*a*.

Additionally, the attachment aperture 64 has a tapered portion 64*b*, which is provided in a manner to couple the rear end of the first constant-diameter portion 64*a* (the end opposite the accommodating space 62) and the front end of the second constant-diameter portion 64*c* (the end proximal to the accommodating space 62) and is formed with decreasing diameter toward the accommodating space 62. The surface that forms this tapered portion 64*b* is inclined at a gradual angle of, preferably, 20 degrees to 40 degrees, and more preferably 25 degrees to 35 degrees (in a suitable example, 30 degrees) relative to the lateral direction X. By use of the tapered portion 64*b* formed at such a gradual angle, the entry of the center conductor 11 and the insulator 12 of the coaxial cable 1 into the tapered portion 64*b* of the attachment aperture 64 can be accurately guided when the cable assembly 3 is inserted into the aperture 64 for the purpose of attachment to the main body portion 51.

The operation of insertion of the cable assembly 3 into the above-described attachment aperture 64 will be described hereinbelow. The cable assembly 3 is inserted into the attachment aperture 64 of the main body portion 51 with the help of a predetermined jig (not shown). In such a case, as shown in FIG. 6, the cable assembly 3 is inserted into the attachment aperture 64 until the front end 21*a* of the third section 3*c* of the cable assembly 3 collides with an annular surface 65 formed at the boundary between the tapered portion 64*b* and the second constant-diameter portion 64*c* (i.e., the section in which the diameter of the attachment aperture 64 changes from a diameter corresponding to the diameter of the third section 3*c* to a diameter corresponding to the diameter of the insulator 12). Upon complete insertion of the cable assembly 3 into the attachment aperture 64 in this manner, the second section 3*b*, in which the insulator 12 is exposed in the cable assembly 3, is retained in the first constant-diameter portion 64*a* and the tapered portion 64*b* of the attachment aperture 64, and the third section 3*c* (the front section of the cable-retaining member 2), to which the cable-retaining member 2 is attached in the cable assembly 3, is retained in the second constant-diameter portion 64*c* of the attachment aperture 64. In this manner, the cable assembly 3, which includes the coaxial cable 1 and the cable-retaining member 2, can be reliably retained in the attachment aperture 64 of the main body portion 51.

On the other hand, as shown in FIG. 5, the inner conductor 55 of the electrical connector 5 has a coupling portion 55*a*, which extends in the direction of mating Z, and connection portions 55*b*, 55*d*, which extend axially toward one end and the other end from the opposite sides of the coupling portion 55*a* in the direction of mating Z. Specifically, the connection portion 55*d* located at the other end has a connecting recess portion 55*e*, which receives the inner conductor (not shown) of the counterpart connector 7. In addition, as shown in FIGS. 6 and 7, a slit (notch, groove) 55*c* extending in the direction of mating Z and in the lateral direction X is formed at the end of the connection portion 55*b* located on the other side, and the center conductor 11 of the coaxial cable 1 is adapted to be inserted into this slit 55*c*. The width of the slit 55*c* of the connection portion 55*b* (its length perpendicular to the direction of mating Z and the lateral direction X) is slightly larger than the diameter of the center conductor 11 of the coaxial cable 1. An electrical connection between the inner conductor 55 and the center conductor 11 is ensured by soldering while the center conductor 11 is inserted into this slit 55*c*.

Furthermore, upon completion of soldering, a lid is attached (press-fitted) to the opening portion 63 in the top portion of the accommodating space 62 and said opening portion 63 is closed, whereupon heat-shrink tubing is attached to the outside of the cable assembly 3 (in particular, to the outside of the section corresponding to the cable-retaining member 2). In this manner, in the cable assembly 3, the solder 17 applied to the outer conductor 13 of the coaxial cable 1 and the window portion 29 of the cable-retaining member 2 are covered by the heat-shrink tubing.

Operation and Effects

The operation and effects of the electrical connector 5 and the electrical connector assembly 100 according to the present embodiment described above will be described next.

The electrical connector 5 according to the present embodiment that has a coaxial cable 1 attached thereto and that mates with a counterpart connector 7, thereby electrically connecting the coaxial cable 1 and the counterpart connector 7, has an inner conductor 55 which extends in the direction of mating Z with the counterpart connector 7 while having one end connected to the center conductor 11 of the coaxial cable 1 and having the other end connected to an inner conductor of the counterpart connector 7, a main body portion 51 which has a tubular shape extending in the direction of mating Z in a manner to accommodate one end of the inner conductor 55, and to which the coaxial cable 1 is attached, and a mating portion 53 which is provided closer to the side where mating with the counterpart connector 7 takes place than the main body portion 51, has a tubular shape extending in the direction of mating Z in a manner to accommodate the other end of the inner conductor 55 and mates with the counterpart connector 7; in the main body portion 51, there are formed an accommodating space 62 constituting a hollow section of a tubular shape extending in the direction of mating Z in a manner to accommodate one end of the inner conductor 55, and an attachment aperture 64 designed to communicate with the accommodating space 62 by extending in the lateral direction X perpendicular to the direction of mating Z and to attach the coaxial cable 1 to the main body portion 51 in a manner to connect the center conductor 11 of the coaxial cable 1 to one end of the inner conductor 55; and the attachment aperture 64 of the main body portion 51 includes a tapered portion 64*b* decreasing in diameter toward the accommodating space 62 at the end (in the vicinity of the end) proximal to the accommodating space 62.

In addition, the electrical connector assembly 100 according to the present embodiment has the above-mentioned electrical connector 5 and a cable assembly 3, which is attached to the main body portion 51 by being inserted into the attachment aperture 64 of the main body portion 51 of the electrical connector 5 and which has a coaxial cable 1 including a center conductor 11 connected to one end of the inner conductor 55 of the electrical connector 5, and a cable-retaining member 2 of a tubular shape attached to the outside of the coaxial cable 1 and retaining said coaxial cable 1. It should be noted that despite the fact that the counterpart connector 7 was included in the electrical connector assembly 100 in FIGS. 1 and 2, the electrical connector assembly 100 need not include the counterpart connector 7.

Figure 8:
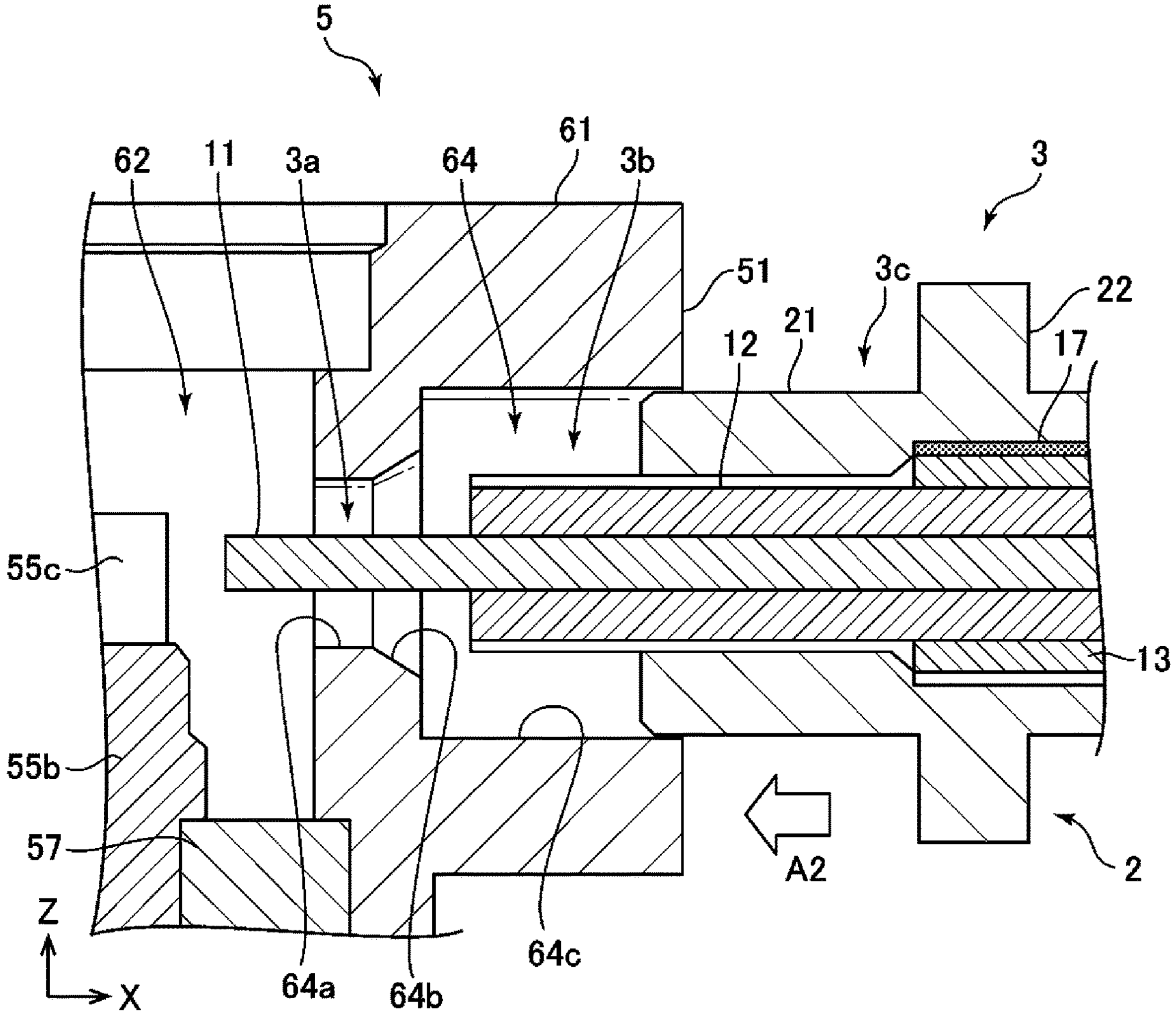
FIG. 8 illustrates a cross-sectional view of a section of the electrical connector and the cable assembly according to an embodiment of the present embodiment taken along the direction of mating.

The operation and effects of this present embodiment will be specifically illustrated with reference to FIG. 8. FIG. 8 is a cross-sectional view of a section of the electrical connector 5 and the cable assembly 3 according to the present embodiment taken along the direction of mating Z. Specifically, FIG. 8 illustrates how the cable assembly 3 is inserted into the attachment aperture 64 of the electrical connector 5

As shown in FIG. 8, as the cable assembly 3 is inserted into the attachment aperture 64 for the purpose of attachment to the main body portion 51 of the electrical connector 5 (arrow A2), first, the center conductor 11 and the insulator 12 located in the front section of the cable assembly 3, i.e., the first section 3*a* and the second section 3*b*, pass through the second constant-diameter portion 64*c*, which has a relatively large diameter. Thereafter, the front end of the center conductor 11 of the cable assembly 3 (the front end of the first section 3*a*) enters the tapered portion 64*b*, which has a relatively small diameter. Since in this case the diameter of the tapered portion 64*b* is basically sufficiently larger than the diameter of the center conductor 11, the center conductor 11 tends to enter the tapered portion 64*b* such that the front end of the center conductor 11 does not make contact with the tapered portion 64*b*. However, due to the fact that the surface of this tapered portion 64*b* is gently inclined, the entry of the center conductor 11 into the tapered portion 64*b* will be guided by the inclined face of said tapered portion 64*b* even if the front end of the center conductor 11 makes contact with the tapered portion 64*b*.

Thereafter, as the center conductor 11 passes through the tapered portion 64*b* and the first constant-diameter portion 64*a*, the front end of the insulator 12 at the rear of the center conductor 11 of the cable assembly 3 (the front end of the second section 3*b*) enters the tapered portion 64*b*, which has a relatively small diameter. In this case, although the front end of the insulator 12 tends to make contact with the surface of the tapered portion 64*b* because the tapered portion 64*b* has a diameter comparable to that of the insulator 12, due to the fact that this surface of the tapered portion 64*b* is gently inclined, the entry of the insulator 12 into the tapered portion 64*b* is guided by the inclined face of said tapered portion 64*b*. This allows the insulator 12 to be accurately positioned with respect to the tapered portion 64*b* and thus makes it possible for the insulator 12 to be reliably introduced into the tapered portion 64*b*.

Reliably introducing the insulator 12 into the tapered portion 64*b* by guiding it along the inclined face of the tapered portion 64*b* in this manner makes it possible for the center conductor 11, which is located more toward the front than the insulator 12, to be accurately positioned with respect to the connection portion 55*b* of the inner conductor 55 located within the accommodating space 62 beyond the tapered portion 64*b* and the first constant-diameter portion 64*a*. Specifically, the center conductor 11 can be accurately inserted into the slit 55*c* of the connection portion 55*b* (see FIG. 7). Therefore, it is possible to reliably minimize the buckling that can occur if the center conductor 11 is not inserted into the slit 55*c* and collides with the wall of the connection portion 55*b*, or a short circuit that can occur upon contact of the center conductor 11 with the inner peripheral surface of the peripheral wall 61.

Here, maintaining a fixed distance between the center conductor 11 of the coaxial cable 1 and the conductors located on the outside of the center conductor 11 (the main body portion 51 of the electrical connector 5, the cable-retaining member 2, the outer conductor 13, etc.) in the electrical connector assembly 100 is important from the standpoint of noise suppression in the radio-frequency signals transmitted by the coaxial cable 1. If this distance changes, there is a chance that noise will be included in the radio-frequency signals. On the one hand, in the present embodiment, upon attachment of the coaxial cable 1 to the attachment aperture 64 of the main body portion 51 of the electrical connector 5, the distance between the center conductor 11 of the coaxial cable 1 and the main body portion 51 of the electrical connector 5 serving as an outer conductor in the tapered portion 64*b* of the attachment aperture 64 will change and there is a chance that noise will be generated. However, if the tapered portion 64*b* is not formed in the attachment aperture 64 and the section corresponding to this tapered portion 64*b* is configured as a portion with a constant diameter (i.e., if the first constant-diameter portion 64*a* is extended to the section corresponding to the tapered portion 64*b*), there is a chance that it will be impossible to accurately position the center conductor 11 with respect to the connection portion 55*b* of the inner conductor 55 of the electrical connector 5 and that this will lead to the buckling and shorting, etc., of the center conductor 11 as described above.

Therefore, in the present embodiment, it was decided to permit some noise in radio-frequency signals and provide this tapered portion 64*b* in the attachment aperture 64 to guide the entry of the insulator 12 into the attachment aperture 64 with a view to giving priority to prevention of the buckling and shorting, etc., of the center conductor 11. In this case, in the present embodiment, not all the sections adjacent to the accommodating space 62 in the attachment aperture 64 are formed in the shape of the tapered portion 64*b* and the first constant-diameter portion 64*a* is provided between the accommodating space 62 and the tapered portion 64*b*. For this reason, by use of the present embodiment, it will be possible to minimize increases in noise in radio-frequency signals while ensuring that the insulator 12 is guided into the attachment aperture 64. In addition, due to the fact that in the present embodiment the surface of the tapered portion 64*b* is formed with a gradual angle of inclination of 20 degrees to 40 degrees relative to the lateral direction X, the entry of the insulator 12 of the coaxial cable 1 into the tapered portion 64*b* of the attachment aperture 64 can be guided in an effective manner.

It should be noted that the embodiments and variations described above are illustrations for explaining the present invention, and the present invention is not limited to these embodiments and variations. The present invention can be implemented in various forms without deviating from the essence thereof.

INDUSTRIAL APPLICABILITY

The inventive electrical connector and electrical connector assembly can be employed for applications such as connecting electronic boards and coaxial cables used for transmission of radio-frequency signals.

DESCRIPTION OF THE REFERENCE NUMERALS

1 Coaxial cable
2 Cable-retaining member
3 Cable assembly
3*a* First section
3*b* Second section
3*c* Third section
5 Electrical connector
7 Electrical connector (counterpart connector)
11 Center conductor
12 Insulator
13 Outer conductor
21, 23 Tubular portions
24, 25, 26 Through-holes
51 Main body portion
52 Coupling portion
53 Mating portion
55 Inner conductor
55*b* Connection portion
55*c* Slit
61 Peripheral wall
62 Accommodating space
64 Attachment aperture
64*a* First constant-diameter portion
64*b* Tapered portion
64*c* Second constant-diameter portion
100 Electrical connector assembly
200 Antenna device
300 Antenna elements
400 Substrate

The invention claimed is:

1. An electrical connector assembly, comprising:

an electrical connector that has a coaxial cable attached thereto and that mates with a counterpart connector, thereby electrically connecting the coaxial cable and the counterpart connector, the electrical connector comprising:

an inner conductor which extends in a direction of mating with the counterpart connector, has one end connected to a center conductor of the coaxial cable and has an other end connected to a conductor in the counterpart connector;

a main body portion which has a tubular shape extending in the direction of mating in a manner to accommodate one end of the inner conductor and to which the coaxial cable is attached; and a mating portion which is provided closer to a side where mating with the counterpart connector takes place than the main body portion, has a tubular shape extending in the direction of mating in a manner to accommodate the other end of the inner conductor and mates with the counterpart connector, wherein, in the main body portion, there are formed:

an accommodating space constituting a hollow section of a tubular shape extending in the direction of mating in a manner to accommodate one end of the inner conductor; and an attachment aperture designed to communicate with the accommodating space by extending in a lateral direction perpendicular to the direction of mating and attach the coaxial cable to the main body portion in a manner to connect the center conductor of the coaxial cable to one end of the inner conductor, and wherein the attachment aperture of the main body portion includes a tapered portion decreasing in diameter toward the accommodating space at an end proximal to the accommodating space; and a cable assembly, which is attached to the main body portion by being inserted into the attachment aperture of the main body portion of the electrical connector and which has the coaxial cable including a center conductor connected to one end of the inner conductor of the electrical connector, and a cable-retaining member of a tubular shape attached to an outside of the coaxial cable and retaining said coaxial cable, wherein the cable assembly has a first section, in which the center conductor is exposed at the end on the side where insertion into the main body portion of the electrical connector takes place, a second section, in which an insulator on the outside of the center conductor is exposed, farther on the side opposite the insertion side than said first section, and a third section, to which the cable-retaining member is attached in a manner to cover at least the insulator, farther on the side opposite the insertion side than said second section, wherein the attachment aperture of the main body portion of the electrical connector further includes a first constant-diameter portion extending in the lateral direction at a diameter corresponding to the diameter of said second section for a purpose of retaining the second section of the cable assembly, and includes a second constant-diameter portion extending in the lateral direction at a diameter corresponding to the diameter of said third section for a purpose of retaining the third section of the cable assembly, and wherein the tapered portion of the attachment aperture is formed between the first constant-diameter portion and the second constant-diameter portion.

2. The electrical connector assembly according to claim 1, wherein the attachment aperture of the main body portion further includes a constant-diameter portion extending in the lateral direction at a diameter corresponding to a diameter of the insulator on an outside of the center conductor of the coaxial cable, and the tapered portion of the attachment aperture is coupled to the accommodating space through a medium of the constant-diameter portion.

3. The electrical connector assembly according to claim 1, wherein a surface that forms the tapered portion of the attachment aperture in the main body portion is inclined at an angle of 20 degrees to 40 degrees relative to the lateral direction.

4. The electrical connector assembly according to claim 1, wherein a slit extending in the direction of mating and in the lateral direction and receiving the center conductor of the coaxial cable is formed at one end of the inner conductor.

* * * * *